United States Patent
Grabau et al.

[11] Patent Number: 5,823,540
[45] Date of Patent: Oct. 20, 1998

[54] POLYMER REINFORCED FLUID SEAL

[75] Inventors: Ted D. Grabau; Robert T. Wilson, both of Marshalltown, Iowa

[73] Assignee: Fisher Controls International, Inc., Clayton, Mo.

[21] Appl. No.: 719,721

[22] Filed: Sep. 25, 1996

[51] Int. Cl.$^6$ .................................................... F16J 9/28
[52] U.S. Cl. ............................................................ 277/227
[58] Field of Search ................................ 277/227, DIG. 6

[56] References Cited

U.S. PATENT DOCUMENTS

| | | | |
|---|---|---|---|
| 4,527,806 | 7/1985 | Ungchusri et al. | 277/124 |
| 4,607,073 | 8/1986 | Sakashita et al. | 524/404 |
| 4,650,815 | 3/1987 | Namba et al. | 521/77 |
| 4,753,444 | 6/1988 | Jackson et al. | 277/DIG. 6 |
| 4,897,439 | 1/1990 | Rau et al. | 524/404 |
| 4,986,511 | 1/1991 | Irby et al. | 277/DIG. 6 |
| 5,039,575 | 8/1991 | Mori et al. | 428/463 |
| 5,131,827 | 7/1992 | Tasaka | 418/55.2 |
| 5,163,692 | 11/1992 | Schofield et al. | 277/205 |
| 5,167,889 | 12/1992 | Alvarez et al. | 264/120 |
| 5,494,301 | 2/1996 | Hamilton et al. | 277/227 |

OTHER PUBLICATIONS

Anonymous, Technical Bulletin, "Material Properties Victrex Peek," Victrex Limited, Lancashire England.

*Primary Examiner*—William A. Cuchlinski, Jr.
*Assistant Examiner*—John L. Beres
*Attorney, Agent, or Firm*—Marshall, O'Toole, Gerstein, Murray & Borun

[57] ABSTRACT

A fluid seal for ball control valves formed from a composition comprising a fluorinated resin, a reinforcing polymer, and, optionally, molybdenum disulfide, which has been compression molded in a tube mold, heat sintered and annealed. Such a formed ball seal has improved properties of chemical resistance, hydrolysis and creep resistance, a sufficient hardness for low wear, a reduced coefficient of friction, and is virtually nonabrasive.

18 Claims, 1 Drawing Sheet

POLYMER REINFORCED FLUID SEAL

This invention relates to fluid seals for flow control devices and in particular to such fluid seals having desired characteristics for use with ball-type flow control valves.

BACKGROUND OF THE INVENTION

Fluid flow control valves are utilized for on/off control or throttling the flow of fluid. Many such flow control valves utilize a rotating ball control member contacting a ball seal. Such flow control devices are characterized as ball valves which can provide high fluid flow handling capacity for gasses, steam, liquids, and fibrous slurries, and provide high flow capacity for many different applications in various process industries.

In view of the varied applications of such ball control valves, the ball seal must have a wide range of temperature resistance and chemical resistance, as well as hydrolysis resistance (i.e., resistance to the long-term effects of hot water and steam). In addition, it is desired that a ball seal for such flow control valves has sufficient hardness and creep resistance properties to provide low wear and low deformation, while also having a low coefficient of friction and exhibiting low air permeability, for reliable sealing without leakage.

A variety of compositions for use as ball seals have been utilized in the past, each of which provides certain of the desired properties, but none of which provides all of the desired properties. For example, prior compositions used to manufacture fluid seals include (a) a polymer-reinforced fluorocarbon resin, such as a polytetrafluoroethylene (PTFE) resin reinforced with a polyimide; (b) PTFE blended with flaked stainless steel as a reinforcing filler; and (c) PTFE blended with flaked Hastelloy C metal as a reinforcing filler. The metal flake-reinforced PTFE compositions provide the toughness and chemical inertness required of a fluid seal, but are abrasive, have a high coefficient of friction, and undesirably scratch the ball control surface, which eventually causes leaks. The polymer-reinforced PTFE compositions overcome the abrasiveness, friction, and ball scratching problem associated with metal flake-reinforced PTFE compositions, but do not provide the desired chemical resistance and hydrolysis resistance properties desired for a fluid seal. In particular, a polyimide-reinforced PTFE is subject to hydrolysis, and, therefore, is subject to an unacceptable amount of creep, or deformation, and is unsuitable for use with hot water or steam over extended time periods.

SUMMARY OF THE INVENTION

In accordance with the principles of the present invention, there is provided a fluid seal, such as a ball seal for fluid control valves, having desired properties, such as chemical resistance, hydrolysis resistance, temperature resistance, low creep and deformation, high hardness, low coefficient of friction, low abrasiveness, and low air permeability.

In particular, there is provided a fluid seal useful as a ball seal for ball control valves which is formed from a composition comprising a fluorocarbon resin, a reinforcing polymer having particular tensile strength and hydrolysis resistance properties, and, optionally, molybdenum disulfide ($MoS_2$). The amount of reinforcing polymer, or blend of polymers, in the composition is about 5 to about 50 weight percent, depending upon the desired stiffness and wear characteristics of the fluid seal. Preferably, the fluorocarbon resin is a nonfree-flowing resin.

A preferred composition for a fluid seal of the present invention comprises about 10 to about 25 weight percent reinforcing polymer, about 1 to about 4 weight percent $MoS_2$, and the balance being a nonfree-flowing fluorocarbon resin. Optional ingredients known to persons skilled in the art also can be included as components of the fluid seal.

In forming the fluid seal from such a composition, a mixture of composition components, preferably in powder form, is admixed until homogenous, then placed into a tube mold where the composition then is subjected to compression molding. Next, the tube mold is heat sintered to melt the resins together, and then annealed. Following sintering and annealing, the finished tube then is machined into the desired size fluid seal. All of the process steps, such as compression molding, sintering, and annealing of the raw materials, and of the finished components, is optimized for maximum density to impart high density and low permeability to the finished fluid seal component.

The present fluid seals have improved chemical resistance and hardness characteristics, with improved resistance to cold flow and reduced seal wear. In addition, a fluid seal formed in accordance with the present invention has a reduced coefficient of friction, eliminates the scratching problems on the control ball associated with prior metal flake-filled PTFE fluid seals, and eliminates the hydrolysis and creep problems associated with prior polyimide-filled PTFE fluid seals.

BRIEF DESCRIPTION OF THE DRAWINGS

The features of this invention which are believed to be novel are set forth with particularity in the appended claims. The invention can be best understood by reference to the following description taken in conjunction with the accompanying drawings, in which like reference numerals identify like elements in the several figures and in which:

DETAILED DESCRIPTION

Figure 1:
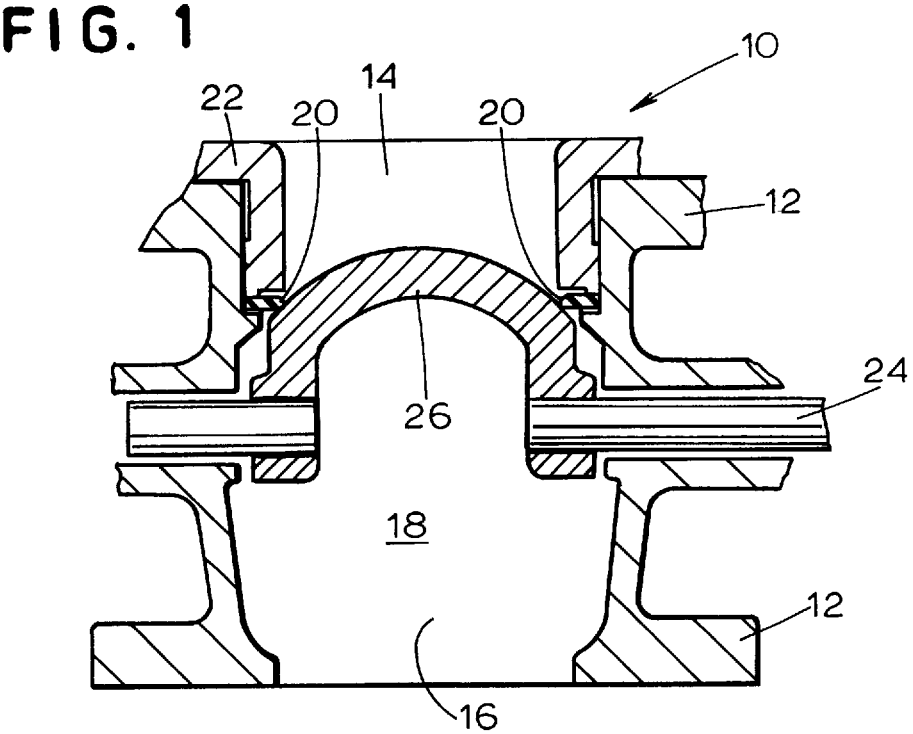
FIG. 1 is a sectional elevational view illustrating a fluid ball control valve with an improved ball seal in accordance with the invention.
Figure 2:
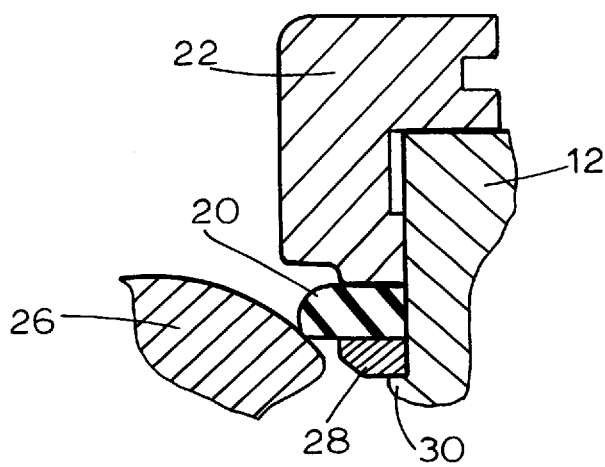
FIG. 2 is a sectional, partly fragmented view illustrating a ball seal formed in accordance with the principles of the present invention.

Referring now to FIGS. 1 and 2, there is illustrated a ball control valve 10 used for fluid flow control and having a valve body 12 with a fluid inlet 14 and a fluid outlet 16 interconnected by a valve body passageway 18. Within the passageway 18 there is mounted a ball seal ring 20, i.e., a fluid seal, mounted in the valve body 12 and maintained securely in position by a seal protector ring 22.

A valve operating element, such as a rotating valve shaft 24 is suitably mounted with bearings within the valve body 12. A ball control member 26 is rigidly fixed to the rotating valve shaft 24 so as to be placed into sealing engagement with the ball seat ring 20 to seal the fluid through the valve, i.e. between inlet 14 and outlet 16. A metal backup ring 28 may be mounted on a valve body shoulder 30 to support the ball seal ring 20, if desired.

The fluid seals of the present invention comprise: (a) a fluorocarbon resin; (b) a reinforcing polymer having at tensile strength of at least about 1600 psi (pounds per square inch) at 250° C. and at least about 14,000 psi at 25° C., and having no appreciable decrease in tensile strength after contact with water or steam at 200° C. and 200 psi for 3,000 hours; and, (c) optionally, molybdenum disulfide. The present fluid seals have a specific gravity of at least about 1.90, and preferably about 1.90 to about 2.00.

In particular, the fluid seals comprise about 5% to about 50%, and preferably about 8% to about 35%, by weight of the seal, of a reinforcing polymer. To achieve the full advantage of the present invention, the fluid seal comprises about 10% to about 25%, by weight of a reinforcing polymer. Varying the amount of reinforcing polymer from about 5% to about 50% by weight changes the stiffness, or hardness, of the fluid seals, but all advantageous properties of the fluid seal are retained. However, if the reinforcing polymer is present in an amount greater than about 50% by weight of the seal, then the seal is difficult to manufacture and is too rigid. If present in an amount less than about 5% by weight, then the reinforcing polymer is not present in a sufficient amount to sufficiently improve the properties of the fluorocarbon resin to provide a fluid seal having the necessary strength to operate for extended periods in harsh environments.

Reinforcing polymers used in the present fluid seals have a tensile strength of at least about 1,600 psi at 250° C. and at least about 14,000 psi at 25° C., when measured by ASTM Test Method D638. Preferably, the reinforcing polymer has a tensile strength at 250° C. of about 1,600 psi to about 3,000 psi, and, to achieve the full advantage of the present invention, at least about 1,700 psi. Preferred reinforcing polymers have a tensile strength of about 14,000 psi to about 25,000 psi at 25° C.

The reinforcing polymers also are sufficiently resistant to hydrolysis such that contact with water or steam at 200 psi and 200° C. does not appreciably decrease the tensile strength of the reinforcing polymer after 3,000 hours, i.e., the tensile strength of the reinforcing polymer is decreased by no more than 10% (i.e., 10% or less) during the course of contact with water or steam at high temperature (200° C.) and pressure (200 psi) for 3,000 hours.

One particularly useful class of reinforcing polymers is the poly(aryletherketone)polymers (PEEK), available from Victrex Limited, Lancashire, England. The PEEK polymers are semicrystalline, linear aromatic polymers, having excellent strength and resistance to hydrolysis. The reinforcing polymer can be present in a powder form or in the form of fibers. A powder form of the reinforcing polymer is preferred. A nonlimiting example of a PEEK polymer is PEEK Grade 450G available from Victrex Limited.

Other classes of reinforcing resins that are useful in the present fluid seals include polyetherketones (PEK) and polyetherketoneketones (PEKK). These reinforcing resins are similar in structure to the PEEK resins, and have comparable or better properties than PEEK resins. Another useful class of reinforcing resins is the polybenzimidazole (PBI) resins, available from Hoechst Celanese Corp., Houston, Tex. under the tradename CELAZOLE™. For example, CELAZOLE™ U-60 has a tensile strength of 23,000 psi at 25° C., when measured by ASTM Test Method D638.

The present fluid seals also contain 0% to about 6%, and preferably about 0.5% to about 5%, of molybdenum disulfide ($MoS_2$). To achieve the full advantage of the present invention, the fluid seals comprise about 1% to about 4% by weight $MoS_2$. The $MoS_2$ is a solid inorganic compound that enhances the properties of the fluid seal, such as improved lubricity and wear properties. A nonlimiting example of molybdenum disulfide is available from Climax Molybdenum Co., Greenwich, Conn., as MOLYSULFIDE®, either Technical Grade, Technical Fine Grade, or Super Fine Grade.

The balance of the fluid seal comprises a fluorocarbon resin, and in particular, a nonfree-flowing grade of a fluorocarbon resin. A preferred fluorocarbon resin is a PTFE, such as, for example, FLUON Grade 580, available from ICI Americas, or TEFLON Grades 7A and 7C, available from E. I. DuPont de Nemours, Wilmington, Del. The use of nonfree-flowing grade of PTFE is preferred in order to provide a fluid seal having a specific gravity of at least 1.90. Other fluorocarbon resins that can be used in the present fluid seals include, but are not limited to, perfluorinated ethylene-propylene resins (FEP), perfluoroalkoxy resins (PFA), ethylene-tetrafluoroethylene resins (ETFE), ethylene-chlorotrifluoroethylene resins (ECTFE), polychlorotrifluoroethylene resins (PCTFE), polyvinylidene fluoride resins (PVDF), and mixtures thereof.

The present fluid seals exhibit less deformation and creep at high temperatures than prior fluid seals, and have excellent chemical resistance. Accordingly, the present seals can be used in harsh environments operating as high as about 275° C. Typically, the present seals have a useful life over a temperature range of about −46° C. to about 232° C. In particular, the present seals outperform prior polyimide-reinforced PTFE seals which are subject to hydrolysis upon contact with water or steam for extended periods. The present fluid seals also exhibit improved wear resistance due to the combination of the reinforcing polymer and $MoS_2$, while avoiding the scratching and abrasion, which is a property of metal flake-reinforced seals. Accordingly, the present fluid seals outperform metal flake-reinforced seals over an extended use period with respect to preventing leaks.

It has been found most advantageous with respect to the desired characteristics of ball seal ring 20 to form the fluid seal from a composition comprising about 17 weight percent of a poly(aryletherketone), i.e., a PEEK, about 3 weight percent molybdenum disulfide ($MoS_2$), and the balance a nonfree-flowing PTFE resin, wherein the composition is compression molded, sintered and annealed for maximum density to provide a fluid seal having low permeability. Such a formed ball seal ring 20 has improved chemical resistance and hydrolysis resistance with respect to the fluids encountered in the ball control valve 10. Also, such a seal has desired hardness and creep resistance characteristics to effectively reduce seal ring wear. Furthermore, a ball ring seal 20 in accordance with the present invention reduces friction and virtually eliminates abrasive contact between the ball seal 20 and the ball control member 26.

For example, in forming the ball seal 20, a composition containing about 17 weight percent of a PEEK polymer (in powder or fiber form), about 3 weight percent $MoS_2$, and the balance being a nonfree-flowing PTFE, remainder preferably all in powder form, are admixed until homogeneous, then placed into a tube mold. Other optional additives can be incorporated into the composition to improve the wear rate and/or coefficient of friction as necessary. The tube mold thereafter is subjected to compression molding and heat sintered in order to melt the admixed resins together. After suitable annealing, the finished component is machined into rings forming the ball ring seal 20. All processing steps, such as compression molding, sintering, and annealing of the raw materials and of the finished components is to be optimized for maximum density to impart low permeability of the finished ball seal ring, i.e., a specific gravity of at least 1.90, and preferably about 1.90 to about 2.00.

A fluid seal of the present invention, formed in accordance with the described process, provides the following properties:

(1) Tensile Strength—at least about 1,900 psi at 25° C. per ASTM Test Method D1457, and usually about 1,900 psi to about 2,000 psi;

(2) Elongation—140% minimum per ASTM D1157;

(3) Specific Gravity—at least about 1.90, and typically about 1.94, per ASTM Test Method D792;

(4) Hardness—64 Durometer D minimum per ASTM Test Method D2240; and (5) Void Content—No voids that are visible with the unaided eye.

With respect to air permeability properties, a fluid seal 20 can be subjected to 100 psi air pressure through an orifice that is sufficiently sealed against its surface, and no leakage is detected with leak detection soap either through the material thickness or adjacent to the pressurized area.

The features of this invention which are believed to be novel are set forth with particularity in the appended claims.

The foregoing detailed description has been given for clearness of understanding only, and no unnecessary limitations should be understood therefrom, as modifications will be obvious to those skilled in the art.

What is claimed is:

1. A nonabrasive fluid seal for flow control devices having improved chemical resistance, resistance to hydrolysis and cold flow, and wear characteristics comprising a composition comprising:

(a) about 5% to about 25% by weight of a reinforcing polymer having a tensile strength of at least about 1,600 psi at 250° C. and at least about 14,000 psi at 25° C., wherein the tensile strength is not appreciably decreased after contact with steam or water at 200° C. and 200 psi for 3,000 hours, (b) 0.5% to about 6% by weight molybdenum disulfide, and (c) 70% to about 95% by weight of a fluorocarbon resin, wherein the seal has a specific gravity of at least about 1.90 to provide a fluid seal having low permeability.

2. The fluid seal of claim 1 wherein the composition comprises about 8% to about 25% by weight of the reinforcing polymer.

3. The fluid seal of claim 1 wherein the composition comprises about 10% to about 20% by weight of the reinforcing polymer.

4. The fluid seal of claim 1 wherein the reinforcing polymer has a tensile strength of about 1,700 psi to about 3,000 psi at 250° C.

5. The fluid seal of claim 1 wherein the reinforcing polymer exhibits a decrease in tensile strength of 10% or less after contact with water or steam at 200° C. and 200 psi for 3,000 hours.

6. The composition of claim 1 wherein the reinforcing polymer is selected from the group consisting of a poly(aryletherketone), a polyetherketone, a polyetherketoneketone, a polybenzimidazole, and mixtures thereof.

7. The fluid seal of claim 1 wherein the reinforcing polymer comprises a poly(aryletherketone).

8. The fluid seal of claim 7 wherein the poly(aryletherketone) is in powder form.

9. The fluid seal of claim 7 wherein the poly(aryletherketone) is in fiber form.

10. The fluid seal of claim 1 wherein the composition comprises about 0.5% to about 5% by weight molybdenum disulfide.

11. The fluid seal of claim 1 wherein the composition comprises about 1% to about 4% by weight molybdenum disulfide.

12. The composition of claim 1 wherein the fluorocarbon resin is selected from the group consisting of a polytetrafluoroethylene resin, a perfluorinated ethylene-propylene resin, a perfluoroalkoxy resin, an ethylene-tetrafluoroethylene resin, an ethylene-chlorotrifluoroethylene resin, a polychlorotrifluoroethylene resin, a polyvinylidene fluoride resin, and mixtures thereof.

13. The fluid seal of claim 1 wherein the fluorocarbon resin comprises a polytetrafluoroethylene resin.

14. The fluid seal of claim 1 wherein the fluorinated resin is in a nonfree-flowing form.

15. The fluid seal of claim 1 wherein the reinforcing polymer and the fluorinated resin are in powder form.

16. The fluid seal of claim 1 wherein the composition comprises:

(a) about 10% to about 25% by weight of the reinforcing polymer;

(b) about 1% to about 4% by weight molybdenum disulfide; and (c) about 70% to about 89% by weight of a fluorinated resin, wherein the fluid seal has a specific gravity of about 1.92 to about 2.00.

17. The fluid seal of claim 1 wherein the composition comprises:

(a) about 15% to about 19% by weight of the reinforcing polymer;

(b) about 2.5% to about 3.5% by weight molybdenum disulfide; and (c) about 77.5% to about 82.5% by weight of a polytetrafluoroethylene resin, wherein the fluid seal has a specific gravity of about 1.94 to about 1.98.

18. A nonabrasive fluid seal for flow control devices having improved chemical resistance, resistance to hydrolysis and cold flow, and hardness characteristics comprising a composition comprising:

(a) a powder form mixture of a fluorinated resin and a reinforcing polymer, in which the reinforcing polymer is about 25 weight percent or less of the mixture, and the fluorinated resin is about 70 weight percent or more of the mixture, said reinforcing polymer having a tensile strength of at least about 1,600 psi at 250° C. and at least about 14,000 psi at 25° C., wherein the tensile strength is not appreciably decreased after contact with steam or water at 200° C. and 200 psi for 3,000 hours; and (b) the balance being molybdenum disulfide in an amount of at least about 0.5 weight percent;

wherein the seal has a specific gravity of at least about 1.90 to provide a fluid seal having low permeability.

* * * * *